United States Patent [19]

Kelledes et al.

[11] Patent Number: 4,805,463
[45] Date of Patent: Feb. 21, 1989

[54] TORQUE TRANSDUCER

[75] Inventors: William L. Kelledes, Brighton; Walter K. O'Neil, Birmingham, both of Mich.

[73] Assignee: Eaton Corporation, Cleveland, Ohio

[21] Appl. No.: 48,159

[22] Filed: May 11, 1987

Related U.S. Application Data

[63] Continuation of Ser. No. 520,358, Aug. 4, 1983, abandoned, which is a continuation of Ser. No. 255,919, Apr. 20, 1981, abandoned.

[51] Int. Cl.$^4$ .............................................. G01L 3/10
[52] U.S. Cl. ..................... 73/862.33; 336/30
[58] Field of Search ............ 73/862.08, 862.33; 324/208; 336/30, 84 C, 79, 87; 340/870.31

[56] References Cited

U.S. PATENT DOCUMENTS

| 839,803 | 1/1907 | Amsler | 73/862.32 |
| 2,754,683 | 7/1956 | Waugh | 73/862.33 |
| 3,166,935 | 1/1965 | Sundt | 73/862.32 |
| 4,356,732 | 11/1982 | Hachtel et al. | 73/862.33 |
| 4,448,084 | 5/1984 | Dobler et al. | 73/862.33 |

FOREIGN PATENT DOCUMENTS

| 2118722 | 11/1972 | Fed. Rep. of Germany | 73/862.33 |
| 2151761 | 4/1973 | Fed. Rep. of Germany | 73/862.33 |
| 422990 | 9/1974 | U.S.S.R. | 73/862.33 |
| 532022 | 10/1976 | U.S.S.R. | 73/862.33 |

Primary Examiner—Charles A. Ruehl
Attorney, Agent, or Firm—J. G. Lewis

[57] ABSTRACT

A torque transducer (10) generates a signal representing torque applied to an input shaft (12) to the transducer. The input shaft is resiliently connected to an output shaft (14), permitting limited relative rotation between the two which is sensed by the selective shunting of an electromagnetic field. Multiple fields and shunting devices (76 and 78) are provided which coact complementarily (in shunting effect) to provide a usable signal throughout an entire range of operation. In application, the transducer is intended for electrically assisted vehicle power steering systems.

45 Claims, 4 Drawing Sheets

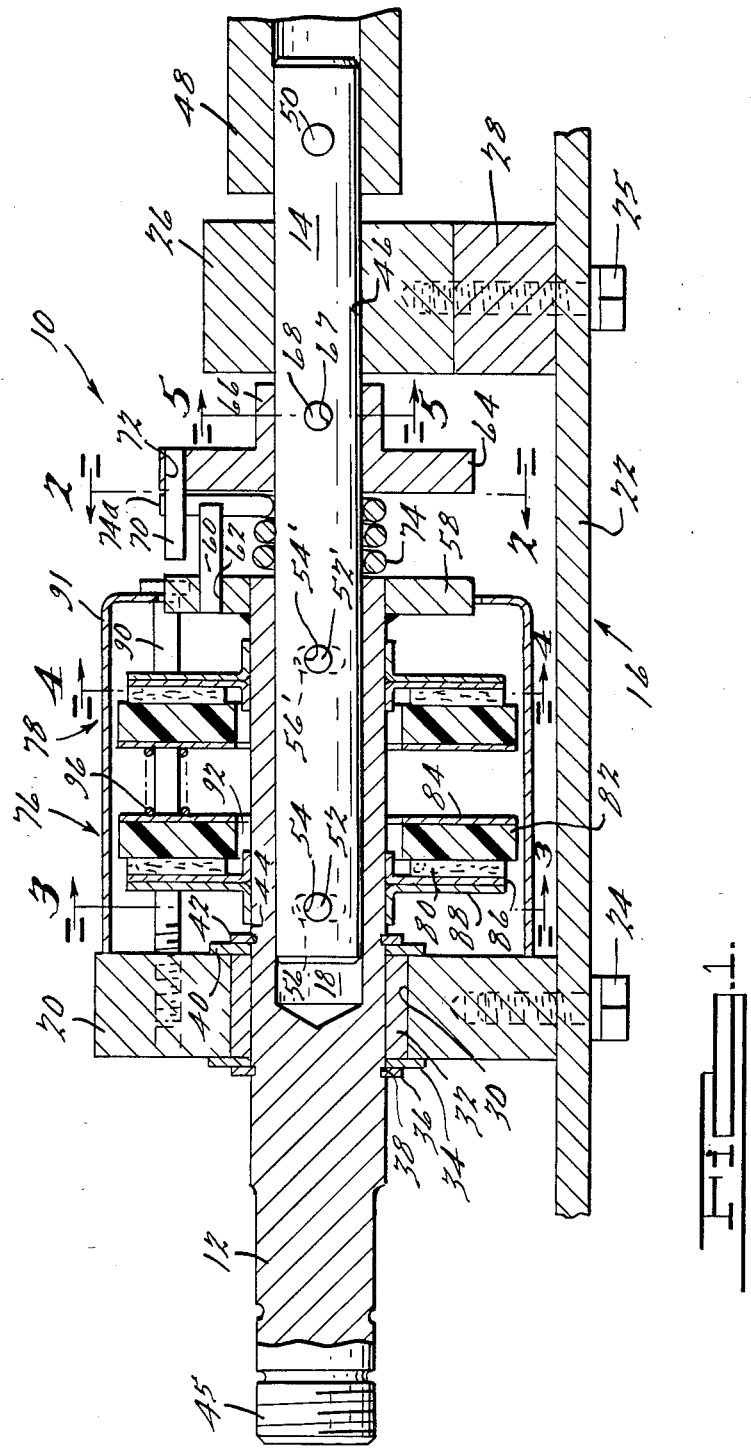

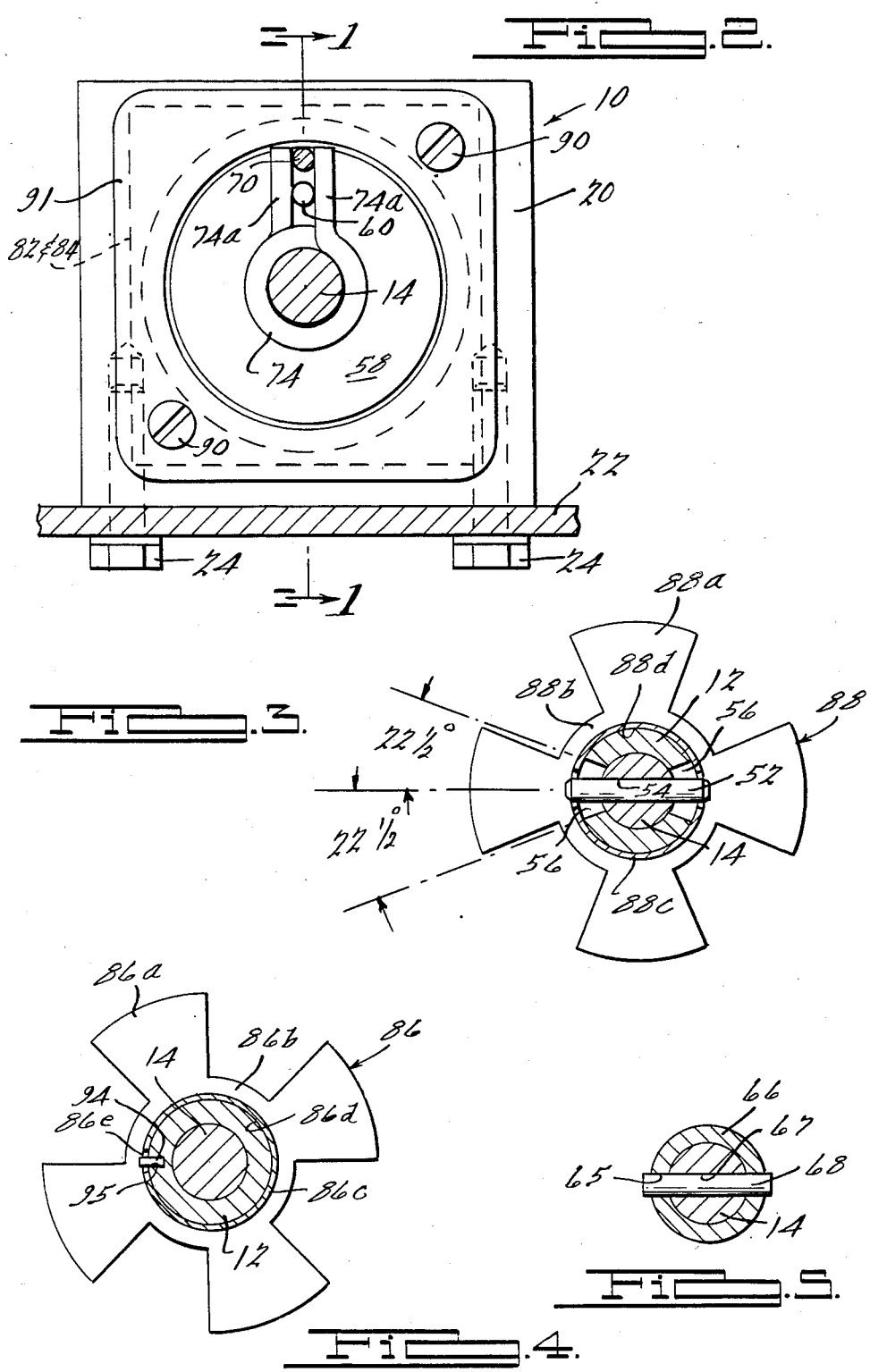

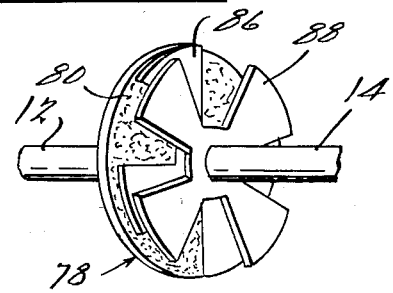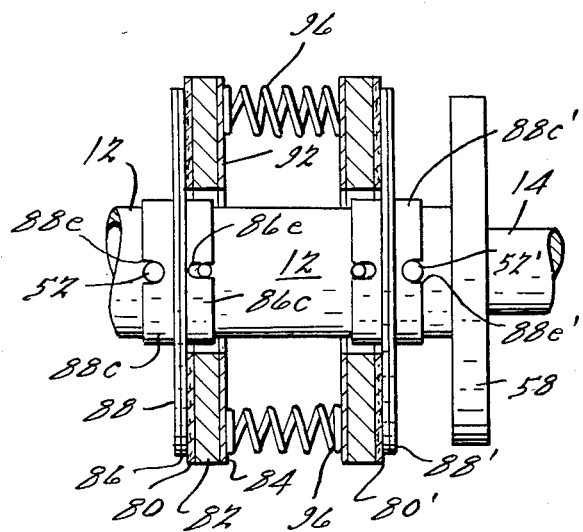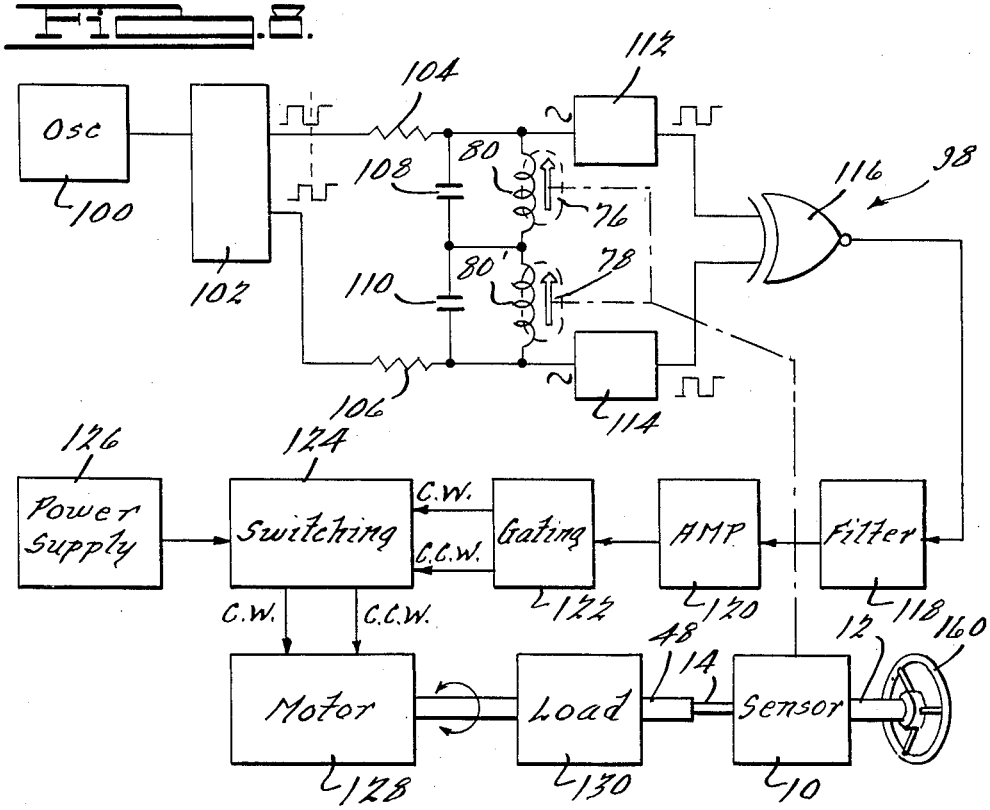

TORQUE TRANSDUCER

This application is a continuation of Ser. No. 520,358, filed Aug. 4, 1983, abandoned, which is a continuation of Ser No. 255,919, filed Apr. 20, 1981, abandoned.

INTRODUCTION

The present invention relates generally to transducers having input and output members which measure applied forces therebetween and, more particularly, to torque-responsive devices for controlling the power steering of a vehicle.

BACKGROUND OF THE INVENTION

Automotive vehicles commonly are provided with power-assist systems to facilitate the steering of the vehicle. Typically, servo motors or other operator input sensitive devices are coupled with the steering linkage or the steerable wheels of the vehicle and are operated in response to rotation of the steering wheel shaft.

Electrical power-assist steering units are often employed in vehicles having motors as prime movers such as electric lift trucks, electric passenger vehicles and the like. Such units employ a transducer for monitoring the operator applied torque in the steering shaft and generating an output signal in response thereto. Such a device is disclosed in U.S. Pat. No. 4,173,265 to Kremer which describes a device for measuring the torque in a shaft. The Kremer device employs two rotatable parts of a shaft which are coupled together through an elastic body for the transmission of torque therebetween. A permanent magnet is carried on one of the rotatable parts in rotational alignment with a differential field plate sensor responsive to the position of the magnet for generating an analog output signal representing torque exerted between the parts of the shaft. In the unloaded condition, the magnet lies opposite the center of the differential field plate sensor.

Devices of the type disclosed by Kremer, although having enjoyed some commercial success, suffer from several shortcomings. Typically such transducers are relatively mechanically complex, requiring frequent servicing and having a short useful life. Expense is a corollary to such mechanical complexity. Specifically, certain components such as Hall effect sensors and permanent magnets have become unduly costly in recent years and thus are not well-suited to high-volume, low cost applications.

Another shortcoming common in some prior art devices resides in the fact that electrical sensory elements are disposed on rotating shafts or other components requiring the use of slip rings, wrapped wire umbilicals or the like, which tend to quickly corrode, become intermittent and deteriorate the performance of the transducer. Additionally, many prior art devices exhibit poor sensitivity through an entire range of operation and are therefore limited in accuracy, repeatability, and the ability to provide the vehicle operator with any kind of "feel" for the vehicle.

It will be apparent from a reading of the Specification that the present invention may be advantageously utilized in many different applications, both mobile and fixed, requiring the precise monitoring of applied forces in general and torques in particular. However, the invention is especially useful when applied to an electric power steering system for an electric vehicle and will be described in connection therewith.

BRIEF DESCRIPTION OF THE INVENTION

The present invention overcomes many of the above described shortcomings of the prior art by providing a transducer which monitors mechanical forces and generates a signal representative thereof. The present invention includes a transducer having two members mounted for relative displacement, a coil or inductor energized to establish an electrical field and a field shunt which engages the members for selective positioning within the field as a function of their relative displacement to effect generation of the member condition signal. This arrangement has the advantage of providing a mechanical force transducer constructed of simple, inexpensive parts and whose performance is not prone to rapid deterioration over time and use.

According to a preferred embodiment of the invention, a torque transducer is described including concentric input and output shafts mounted for relative rotational displacement and which generates a signal representative of torque applied to the input shaft in response to relative rotational displacement of the shafts. This arrangement provides the advantage of a torque transducer which can be inserted in-line with a vehicle steering system or the like.

According to another aspect of the present invention, a frame or housing is provided to retain the shafts in an axially fixed relationship as well as to hold the inductor(s) while permitting the shafts to jointly continuously rotate. This arrangement has the advantage of positioning all electrical components in a fixed relationship with the frame, thereby eliminating the need for slip rings, umbilical connections and the like.

According to another aspect of the invention, two magnetically isolated inductors are provided which are energized to establish two distinct electromagnetic fields. As electromagnetic field shunt assembly is provided within each field, each shunt assembly engaging the shafts for selective, complementary positioning within the electromagnetic fields in response to relative rotational displacement of the shafts. This arrangement, by virtue of the differential action which eliminates common mode drift and other undesirable effects in the transducer and electronic circuitry, has the advantage of providing a usable repeatable, stable output signal through the full range of operation of the torque transducer.

According to still another aspect of the invention, in one embodiment the shunt assemblies comprise first and second pairs of adjoining rotary vanes, each disposed within one of the electromagnetic fields and operable to selectively shunt substantially all of its associated electromagnetic field. In another embodiment, the shunt assemblies comprise a generally cylindrical carrier disposed concentrically with one of the shafts which simultaneously complementarily shunts the electromagnetic fields by selectively axially shuttling between two fixed limits of travel. This arrangement provides two species of the present invention, each of which have particular advantages, depending upon the specific application comtemplated.

These and other aspects and advantages of this invention will become apparent upon reading the following Specification, which, along with the patent drawings, describes and discloses a preferred and an alternative embodiment of the invention in detail.

A detailed description of the Embodiments of the Invention makes reference to the accompanying drawings.

BRIEF DESCRIPTION OF THE DRAWINGS

FIG. 1, is a cross-sectional view of the preferred embodiment of the inventive torque transducer;

FIG. 2, is a cross-sectional view taken on line 2—2 of FIG. 1;

FIG. 3, is a cross-sectional view taken on line 3—3 of FIG. 1;

FIG. 4, is a cross-sectional view taken on line 4—4 of FIG. 1;

FIG. 5, is a cross-sectional view taken on line 5—5 of FIG. 1;

FIG. 6, is a broken perspective view of one of the inductor and field shunting assemblies of the torque transducer of FIG. 1;

FIG. 7, is a side cross-sectional view, partly in relief, of the torque transducer of FIG. 1;

FIG. 8 is a schematic diagram of a logic circuit employed with the torque transducer of FIG. 1;

Figure 9:
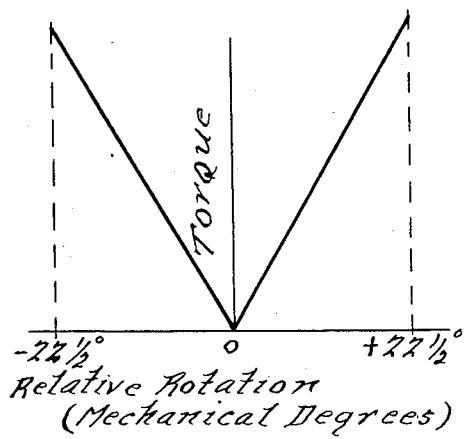
FIG. 9, is a graphical illustration of the applied torque versus relative rotation (mechanical degrees) characteristic of the torque transducer of FIG. 1.

DETAILED DESCRIPTION OF THE PREFERRED AND ALTERNATIVE EMBODIMENTS OF THE INVENTION

Referring to FIGS. 1 through 5, a preferred embodiment of a torque transducer assembly (hereinafter referred to as torque sensor) is illustrated. Torque sensor 10 is intended for use as an electric torque sensor for a vehicle electric power steering system. Sensor 10 is adapted for in-line insertion with a vehicle's steering linkage to sense torque applied at the steering wheel by an operator and to generate a system controlling torque demand signal to provide a power steering assist in lift truck type vehicles (by way of example).

Torque sensor 10 comprises an input shaft or member 12, an output shaft or member 14 and a frame or housing assembly shown generally at 16. Output shaft 14 is loosely telescopingly disposed within a rightwardly (as viewed in FIG. 1) opening bore 18 within input shaft 12. This arrangement maintains concentricity of shafts 12 and 14 while permitting relative rotation therebetween. Frame assembly 16 comprises an input shaft mounting block 20 mounted to a frame member 22 by bolts 24 or the like and an output shaft mounting block 26 mounted to frame member 22 through an intermediate spacing block 28 by additional bolts 25 or the like. Thus, frame assembly 16 forms a single rigid structure which, in application, would be affixed to the vehicle with which torque sensor 10 is associated.

Input shaft 12 passes through an aperture 30 within input shaft mounting block 20 and is supported radially by an intermediate sleeve bearing 32 press fit within aperture 30. A first thrust washer 34 is carried by input shaft 12 and abuts the left-hand most surface of input shaft mounting block 20. Washer 34 is held in place by a snap ring 36 residing in a circumferential slot 38 formed in input shaft 12. Likewise, a second thrust washer 40 is carried by input shaft 12 and abuts the right-hand most surface of mounting block 20. A second snap ring 42 disposed within a circumferential slot 44 prevents washer 40 from righward axial displacement. Snap rings 36 and 42 coact to hold the assembly of washers 34 and 40 and sleeve bearing 32 in the illustrated position thereby input shaft 12 is radially and axially supported by frame assembly 16 but allowed to freely rotate therein.

Input shaft 12 extends leftwardly from mounting block 20 and terminates in a threaded portion 45 which is intended, in application, to receive a steering wheel or other suitable input linkage whereby shaft 12 receives operator applied torque in the process of steering the associated vehicle.

Output shaft 14 extends rightwardly from its point of emergence from bore 18 within input shaft 12, passing through an aperture 46 within output shaft mounting block 26. Output shaft 14 loosely fits within aperture 46 and is thus free to rotate therein but is prevented from radial displacement thereby. It is contemplated that a bearing could be provided to support output shaft 14 as in the case of input shaft 12. Output shaft 14 extends rightwardly from output shaft mounting block 26 and, in application, is mechanically linked to a load such as the steered wheels of the associated vehicle through interconnecting linkage 48. Linkage 48 is secured for rotation to output shaft 14 by an anchor pin or dowel 50 which passes through registering radially directed bores therein.

As can best be seen in FIG. 3, input and output shafts 12 and 14 are linked to provide limited relative rotation by a dowel 52 press fit within a radial bore 54 within output shaft 14. Dowel 52 extends radially outwardly in both directions through registering apertures 56 within input shaft 12. Apertures 56 are circumferentially elongated to permit limited relative rotation of ±22.5° from a nominal centered position (illustrated). Thus, when torque is applied to input shaft 12, it will freely rotate without affecting output shaft 14 through the first 22.5° of rotation in either direction. At ±22.5° of relative rotation, the radially outward most ends of dowel 52 will contact input shaft 12 and thus applied torque will be transmitted to output shaft 14. Thereafter, shafts 12 and 14 are permitted to jointly continuously rotate. Dowel 52 serves an additional function of preventing relative axial displacement between input and output shafts 12 and 14.

Dowel pin 52 extends radially outwardly of the outer surface of input shaft 12 for reasons that will become apparent herein below. Additionally, a second dowel pin 52' passing through a bore 54' within output shaft 14 and circumferentially elongated registering apertures 56' within input shaft 12 is provided (refer FIG. 1) at a point axially displaced from pin 52, which functions as described in connection with the description of pin 52 hereinabove and in concert therewith. The need for pin 52' will become apparent in the description herein below.

Input shaft 12 has a radially outwardly extending annular flange 58 affixed at the right-hand most (as viewed in FIG. 1) extent thereof. An anchor pin 60 is press fit within an aperture 62 in flange 58 and extends rightwardly therefrom.

A second radially outwardly extending annular flange 64 is carried by output shaft 14 at a point rightwardly spaced from flange 58. Flange 64 includes an integral hub portion 66. A press fit dowel pin 68 (as is best viewed in FIG. 5) passes through registering apertures 67 and 65 in output shaft 14 and hub portion 66, respectively, to secure flange 64 to output shaft 14 for rotation therewith. A second anchor pin 70 is press fit within an aperture 72 at the radially outward most extent of flange 64 which extends leftwardly therefrom. As is best illustrated in FIG. 2, anchor pin 70 is located radially outwardly of anchor pin 60 to provide rotational clearance therebetween. Anchor pins 60 and 70 are positioned in flanges 58 and 64, respectively, so as to be in angular alignment when input and output shafts 12 and 14 are in their nominal centered position. A coil spring 74 is loosely carried on output shaft 14 intermediate flanges 58 and 64. The ends 74a of coil spring 74 are directly radially outwardly and extend beyond anchor pin 70 in a generally parallel spaced fashion. Ends 74a are positioned to simultaneously straddle anchor pins 60 and 70 and to bear thereagainst whenever shafts 12 and 14 are in other than their nominal centered position. Restated, spring 74 acts to bias input and output shafts 12 and 14 into their nominal centered position and will do so whenever torque is being applied to input shaft 12.

Spring 74, anchor pins 60 and 70 and flanges 58 and 64 therefore comprise resilient means which, during the first ±22.5° of relative rotation between input and output shafts 12 and 14 transmit force (torque) therebetween. Once 22.5° of relative rotation is realized, dowels 52 and 52' take over to directly transmit force (torque) between input and output shafts 12 and 14. By its arrangement, spring 74 acts bidirectionally to urge shafts 12 and 14 back into their nominal centered position.

Two electromagnetic field shunt assemblies designated 76 and 78 generally are disposed between input shaft mounting block 20 and flange 58. The details of construction of shunt assemblies 76 and 78 are identical, and thus for sake of brevity only one will be described in detail. The detailed operation of shunt assemblies 76 and 78 is best understood by simultaneous reference to drawing FIGS. 1, 3, 4, 6, and 7. Each electromagnetic field shunt assembly 76 and 78 comprises an electrical coil or inductor 80 mechanically supported by a plastic carrier 82 backed by an aluminum shield washer 84, a first vane assembly 86 and a second vane assembly 88, all concentrically disposed about input and output shafts 12 and 14.

Coil 88 is mounted to carrier 82 which, in turn, is secured from all but axial displacement to input shaft mounting block 20 by two diagonally opposed elongated cover mounting screws 90. Carrier 82 is square in cross-section as best seen in FIG. 2 and screws 90 pass through two of its diagonal corners for reasons which will become apparent herein below. Vane assemblies 86 and 88 as well as coil 80 are generally of circular cross-section so as not to interfere with mounting screws 90 during operation of torque sensor 10. Input shaft 12 passes through a relatively large passageway 92 in carrier 82 so as not to contact same. First vane assembly 86 comprises four circumferentially spaced vanes or segments 86a depending radially outwardly from an annular root portion 86b. Root portion 86b integrally transitions into an axially directed hub portion 86c. The radially innermost surface of hub portion 86c forms a guide surface 86d which circumferentially rests on input shaft 12 and is restrained from radial displacement thereby but is free for axial displacement therealong. Vane assembly 86 is secured for rotation with input shaft 12 by a small dowel pin 94 press fit within a radially outwardly opening blind hole 95 within input shaft 12. Dowel pin 94 extends radially outwardly through an axially elongated registering slot 86e in hub portion 86c of vane assembly 86. Slot 86e is best illustrated in FIG. 7. Each vane 86a defines an angular segment of approximately 45°.

Second vane assembly 88 is constructed similarily to first vane assembly 86, including four circumferentially spaced vanes 88a depending radially outwardly from a root portion 88b. The radially innermost portion of root portion 88b transitions into axially aligned hub portion 88c. The radially innermost surface of hub portion 88c defines a support surface 88d which rides upon the circumferential surface of input shaft 12. The radially outwardmost extent (ends) of dowel 52 reside within axially elongated registering notches 88e in second vane assembly 88. Accordingly, second vane assembly 88 is prevented from radial displacement by input shaft 12 but is linked for rotational displacement with output shaft 14 through dowel 52. The individual vanes 88a of second vane assembly 88 define approximate 45° angular segments.

Vanes 86a and 88a are positioned so that when shafts 12 and 14 are in their nominal centered position, overlaying corresponding vanes are 22.5° out-of-phase as illustrated in FIG. 6. Thus, in the centered condition four 22.5° segments of coil 80 are exposed or remain uncovered by electromagnetic field shunt assembly 76. Electromagnetic field shunt assembly 78 illustrated in FIG. 6 is simplified to illustrate the relative relationship of vane assemblies 86 and 88 with respect to coil 80 in the nominally centered position.

The structure of electromagnetic field shunt assembly 78 is substantially as depicted herein above. Two axially aligned electromagnetic field shunt assembly biasing springs 96 carried on bolts 90 tend to bias assemblies 76 and 78 apart from one another. Springs 96 tend to bias shield washer 84 of assembly 76 leftwardly abutting carrier 82 and coil 80. Coil 80 is then, in turn, biased against the right-hand most surface of the vanes 86a of vane assembly 86 (through an intermediate milar washer if desired). The left-hand most surface of vane assembly 86 is then biased against the right-hand most surface of vane assembly 88 (through an intermediate optional milar washer). The left-hand most limit of travel of vane assembly 88 and thus the entire assembly 76 is reached when notch 88e contacts dowel 52. Likewise, electromagnetic field shunt assembly 78 is biased by springs 96 rightwardly until notch 88e' in hub portion 88c' of second vane assembly 88' abuts dowel 52'. The applicant notes that FIG. 7 has been simplified somewhat in selected areas to simplify understanding of the present Specification.

The arrangement of shunt assemblies 76 and 78 is intended to insure intimate contact between coils 80 (80') and their associated vane assemblies 86 and 88 (86' and 88'). The biasing effect of springs 96 also compensates for wear over extended use of torque sensor 10. Finally, for reasons which should become apparent herein below, the present arrangement provides adequate spacing to insure that energization of coils 80 and 80' will generate two substantially discreet or independent electromagnetic fields. By way of definition, isolated electromagnetic fields means fields spaced or shielded so that any magnetic coupling therebetween is incidental and has an insignificant effect upon overall operation of sensor 10.

Cover mounting screws 90 extend rightwardly (in FIG. 1) from electromagnetic field shunt assembly 78 and secure a cup-shaped cover housing 91 to input shaft mounting block 20. Mounting block 20 and housing 91 coact to completely enclose electromagnetic field shunt assemblies 76 and 78 with suitable sealing means (not illustrated).

Figure 10:
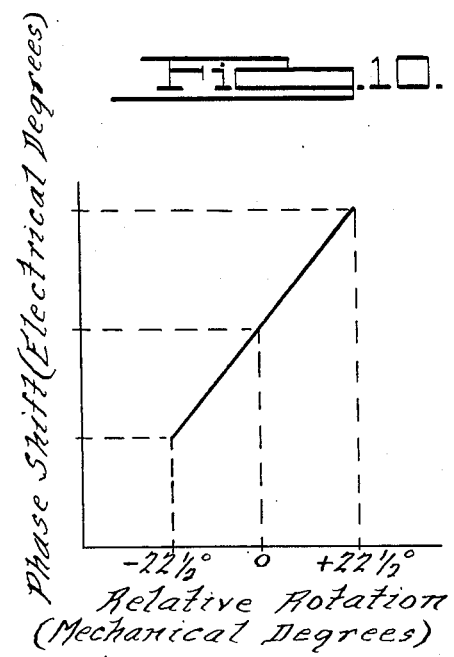
FIG. 10, is a graphical presentation of the phase shift (electrical degrees) versus relative rotation characteristic of the torque transducer of FIG. 1.

The operation of torque transducer 10 is best illustrated by reference to FIGS. 6, 8, 9, and 10. Coils 80 and 80' are electrically energized to form separate, isolated axially aligned fields. Vane assemblies 86 and 88 coact to define shutters which selectively shunt the electromagnetic field associated therewith as a function of the portion of the coil 80 covered thereby. As can be seen in FIG. 10, the amount of mechanical rotation for each set of vane assemblies 86 and 88 is linearly directly correlatable to the electrical phase shift of the voltage impressed across coil 80. This mechanical rotation to electrical phase shift relationship can be expressed in a relative rotation to torque applied on input shaft 12 relationship as expressed in FIG. 9. Referring again to FIG. 6, as vane assemblies 86 and 88 are rotated with respect to one another from the nominal centered position illustrated, more or less of coil 80 will be exposed and thus more or less of the field generated thereabout will be shunted. At one extreme of relative rotation, substantially all of the surface area of coil 80 will be covered and at the other extreme of relative rotation, the 45° vane segment 86a and 88a will be in alignment whereby only one-half of the total surface area of coil 80 will be covered. The input/output shafts, housing and frame, 12, 14, 91, and 16 respectively, are constructed of steel. Vane assemblies 86 and 88 are constructed of aluminum. However, it is contemplated that other diamagnetic materials as well as paramagnetic and ferrous metals could be employed to provide the shunting function as should be obvious to those of ordinary skill in the art in light of the present Specification.

Vane assemblies 86 and 88 and 86' and 88' of shunt assemblies 76 and 78 are oriented to provide complementary operation. By way of definition, such operation entails the closing of one shutter with the simultaneous opening of another. When in the nominally centered position illustrated in FIG. 6, both shunt assemblies exhibit a 22.5° offset. When a relative rotation of 22.5° is achieved (the limit) one of the pairs of vane assemblies 86 and 88 totally covers its respective coil for maximum shunting effect while the other pair are in register for the minimum shunting effect. This arrangement effectively doubles the usable signal available to the control circuit described herein below.

Operation of torque sensor 10 is best understood by referring to a schematic diagram in FIG. 8 illustrating a control circuit designated 98 employed therewith. Electromagnetic field shunt assemblies 76 and 78 effectively operate as air core transformers. When coils 80 and 80' are excited with a high-frequency AC signal, vane assemblies 86 and 88 act as short-circuited secondary coils. As a greater area of coils 80 and 80' are covered by the metal vane assemblies 86 and 88, electrically more and more "secondary transformer coils" are effectively shorted and thereby more magnetic flux is captured and absorbed via generation of eddy-currents.

Referring to FIG. 8, a high-frequency oscillator 100 provides an AC signal to a divider or flip-flop 102 which outputs two square wave signals which are 90° out-of-phase. Oscillator 100 is operating at 450 khz. Divider 102 is a 4013 CMOS. The outputs from divider 102 pass through current-limiting resistors 104 and 106 and feed the points of common connection between a capacitor 108 and inductor 80, and a capacitor 110 and inductor 80', respectively. Capacitor 108 and coil 80 form a tank circuit having a sine wave output. Likewise, capacitor 110 and coil 80' form a second independent tank circuit having a sine wave output. The frequency of oscillator 100 is selected to drive the tank circuits at or near resonance. The sine wave outputs from the tank circuits have a phase relationship determined by the relative angular displacement between input and output shafts 12 and 14. As vanes 86a and 88a (86a' and 88a') collectively overlay more or less of coils 80 and 80' and thus shunt more or less of the electromagnetic fields associated therewith, the resonant frequency of the tank circuits will shift as will the relative phase relationship of their sine wave outputs. The output of the tank circuit associated with resistor 104 is fed to a high gain amplifier 112 and the output of tank circuit associated with resistor 106 is fed to a second high gain amplifier 114. Amplifiers 112 and 114 are employed to permit comparison of the phase relationship (zero crossing) of the signals from the tank circuits. The gain of amplifiers 112 and 114 is relatively large and will cause the signal to saturate, resulting in a square wave output from each. Type 4069 inverter packages were employed in open loop configuration.

The outputs of amplifiers 112 and 114 are fed to the inputs of an exclusive-or gate 116. Gate 116 will generate an output when and only when there is a difference between the signals at the two inputs. As a result, the output of gate 116 is a pulse whose width is modulated by the amount of phase shift present. These pulses can be from very low to almost 100% duty cycle. If for example, at the nominal centered position, a 50% duty cycle is realized, that can be established as a norm for the steering center and as the steering wheel is turned left or right, the duty cycle will become less or more, which can be subsequently recognized as a demand for left steer or right steer.

The output of gate 116 represents torque demand and is passed through a filter 118 as a DC level. In practice, filter 118 is of the RC type having an output which is an average DC voltage whereby if the incoming pulse becomes longer, the voltage level increases and if the pulse becomes shorter, the voltage level decreases. The torque demand signal is then processed by passing it into an amplifier stage 120 and then through gating 122 to generate appropriate clockwise or counterclockwise control signals for a power switching circuit 124. A power supply 126 feeds switching circuit 124 which, depending upon the gating control signal received will drive a motor 128 in a clockwise or counterclockwise orientation. The motor 128, in turn, is mechanically linked to a load 130 which, in the intended application, comprises the steered wheel and its associated linkage mechanisms. Transducer 10 is mechanically interconnected to load 130 by linkage 48 as well as to an operator manipulated steering wheel 160 by input shaft 12.

Figure 11:
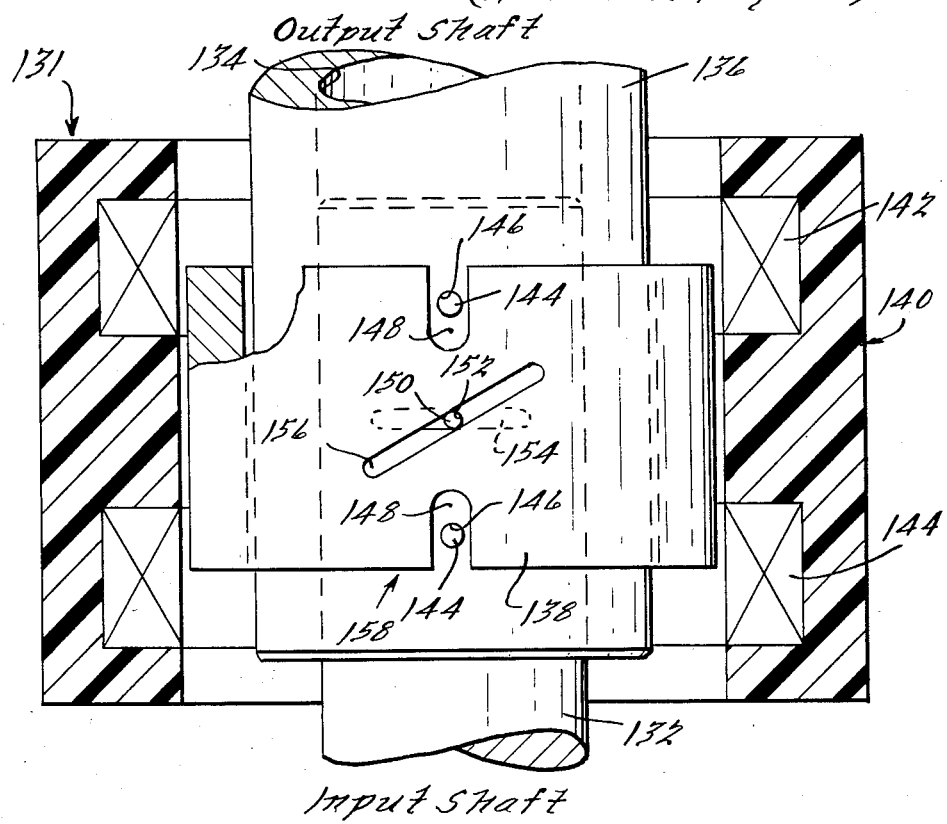
FIG. 11, is a cross-sectional view (partly in broken relief) of an alternative embodiment of the invention.

Referring to FIG. 11, an alternative embodiment of the present invention (torque sensor 131) is illustrated which operates substantially as the preferred embodiment of the invention described hereinabove. A steel input shaft 132 is loosely disposed within a bore 134 within a steel output shaft 136 for relative rotation therein. An aluminum cylindrical carrier 138 is disposed concentrically externally of output shaft 136. Finally, a non-metallic cylindrical bobbin housing, generally designated 140, is disposed externally of carrier 138 and supports two inductors or coils 142 and 145 in an axially spaced relationship. When energized electrically, inductors 142 and 145 established distinct, isolated electromagnetic fields thereabout. Carrier 138 is prevented from radial displacement by virtue of its telescoping relationship between output shaft 136 and housing 140. Two dowel pins 144 are press fit within outwardly opening blind bores 146 within output shaft 136, and pass radially outwardly through registering axially elongated slots 148 in carrier 138. Dowel pins 144 prevent relative rotation between carrier 138 and output shaft 136. Carrier 138 is otherwise free for relative axial displacement with respect to shafts 132 and 136 between two limits of travel defined by the points at which dowel pins 144 bottom out in slots 148. FIG. 11 illustrates carrier 138 in its nominal centered position in which it nominally overlays half of the inner surfaces of coils 142 and 145. A dowel pin 150 is press fit within a radially outwardly opening blind bore 152 within input shaft 132 which passes radially outwardly through a circumferentially elongated slot 154 within output shaft 136 and an axially skewed elongated slot 156 in carrier 138.

In the nominal centered position, pins 144 and 150 are in rotational alignment, causing carrier 138 to assume a central position between inductors 142 and 145. Whenever shafts 132 and 136 are rotated relative with one another, pins 144 and 150 will likewise be angularly displaced. Such angular displacement will cause pin 150 to cam against the surfaces of carrier 138 defining slot 156, causing axial displacement in one direction or the other. Such displacement will occur through a limited travel. At one limit of travel, carrier 138 will completely overlay the inner surface of inductor 142 while totally exposing the inner surface of inductor 145, and at the other limit of travel, will totally overlay the inner surface of inductor 145 and expose inductor 142. This arrangement will result in the same operation as was described in detail hereinabove when torque sensor 131 is combined with or includes a logic circuit such as that described in connection with FIG. 8.

A detailed logic circuit description has not been included in the description of the alternative embodiment of the invention for the sake of brevity. However, for completeness, the circuit of FIG. 8 could substitute inductors and 80 and 80' and 142 and 145 with substantially identical results. Finally, carrier 138 as well as the system of dowel pins 144 and 150 and slots and notches 148, 154 and 156 comprise an electromagnetic field shunting assembly shown generally at 158.

It is to be understood that the invention has been described with reference to specific embodiments which provide the features and advantages previously described, and that such specific embodiments are susceptible to modification, as will be apparent to those within the art. Accordingly, the foregoing description is not to be construed in a limiting sense.

What is claimed is:

1. A transducer comprising:
   first and second members mounted for relative displacement;
   at least one inductor;
   control means in circuit with said inductor operative to effect flow of alternating current therethrough to establish an electromagnetic field thereabout; and
   electromagnetic field shunting means operatively engaging said members for selective positioning within said electromagnetic field in response to the relative displacement of said members to effect a change in phase of said alternating current, said control means further effecting generation of a member condition signal as a function of said alternating current phase change.

2. The transducer of claim 1, further comprising means resiliently interconnecting said members for the transmittal of force therebetween.

3. The transducer of claim 2, wherein said resilient means acts bidirectionally.

4. The transducer of claim 1, further comprising means operative to limit said relative displacement to a predetermined range about a nominal centered position.

5. The transducer of claim 4, further comprising means operative to bias said members towards said centered position.

6. The transducer of claim 1, further comprising housing means operative to support said members and to carry said inductor.

7. A torque transducer comprising:
   an input shaft;
   an output shaft mounted for rotational displacement relative to said input shaft;
   at least one inductor;
   control means in circuit with said inductor operative to effect flow of alternating current therethrough to establish an electromagnetic field thereabout; and
   electromagnetic field shunting means operatively engaging said shafts for selective positioning within said electromagnetic field in response to the relative displacement of said shafts to effect a change in phase of said alternating current, said control means further effecting generation of an input shaft applied torque signal as a function of said alternating current phase change.

8. The transducer of claim 7, further comprising means resiliently interconnecting said shafts for the transmittal of torque therebetween.

9. The transducer of claim 8, wherein said resilient means acts bidirectionally.

10. The transducer of claim 8, wherein said resilient means comprises a spring.

11. The transducer of claim 7, further comprising means operative to limit said relative rotation to a predetermined range about a nominal centered position.

12. The transducer of claim 11, further comprising means operative to bias said shafts towards said centered position.

13. The transducer of claim 7, further comprising housing means operative to retain said shafts in an axially fixed relationship and to carry said inductor.

14. A torque transducer comprising:
   an input shaft for receiving operator applied torque;
   an output shaft adapted for operatively engaging a load;
   first and second magnetically isolated inductors;
   control means in circuit with said inductors operative to effect flow of alternating current therethrough to establish a distinct electromagnetic field about each of said inductors; and
   electromagnetic field shunt assemblies operatively engaging said shafts for selective complementary positioning within said electromagnetic fields in response to relative rotational displacement of said shafts to effect a change in phase of said alternating current in each of said inductors, said control means further comprising comparator means operative to generate a signal representative of said applied torque as a function of the difference in alternating current phase change between said respective inductors.

15. The torque transducer of claim 14, further comprising means resiliently interconnecting said shafts for the transmittal of torque therebetween.

16. The transducer of claim 15, wherein said resilient means acts bidirectionally.

17. The transducer of claim 15, wherein said resilient means comprises a coil spring disposed concentrically with one of said shafts.

18. The transducer of claim 14, further comprising means operative to limit said relative rotation to a predetermined range about a nominal centered position.

19. The transducer of claim 18, further comprising means operative to bias said shafts towards said centered position.

20. The transducer of claim 14, further comprising means operative to retain said shafts in an axially fixed relationship and to carry said inductor.

21. The transducer of claim 14, wherein said shunt assemblies comprise first and second pairs of adjoining rotary vanes, each said pair disposed within one of said electromagnetic fields and operable to selectively shunt substantially all of its associated electromagnetic field.

22. The transducer of claim 14, wherein said inductors are disposed coaxially with one of said shafts and axially spaced from one another.

23. A torque transducer comprising:
an input shaft for receiving operator applied torque;
an output shaft disposed coaxially with said input shaft and adapted for operatively engaging a load;
a housing operative to retain said shafts in an axially fixed relationship;
a logic circuit comprising first and second magnetically isolated inductors carried by said housing and energization means in circuit with said inductors operative to effect a flow of alternating current therethrough to establish a distinct electromagnetic field about each of said inductors; and
electromagnetic field shunt assemblies operatively engaging said shafts for selective complementary positioning within said electromagnetic fields in response to relative rotational displacement of said shafts to effect a change in phase of said alternating current in each of said inductors, said logic circuit further comprising comparator means operative to generate a signal representative of said applied torque as a function of the difference in alternating current phase change between said respective inductors, said logic circuit further comprising comparator means operative to generate a signal representative of said applied torque as a function of the difference in alternating current phase change between said respective inductors.

24. The torque transducer of claim 23, further comprising means resiliently interconnecting said shafts for the transmittal of torque therebetween.

25. The transducer of claim 24, wherein said resilient means acts bidirectionally.

26. The transducer of claim 24, wherein said resilient means comprises a coil spring disposed concentrically with one of said shafts.

27. The transducer of claim 23, further comprising means operative to limit said relative rotation to a predetermined range about a nominal centered position.

28. The transducer to claim 27, further comprising means operative to bias said shafts towards said centered position.

29. The transducer of claim 23, further comprising means operative to retain said shafts in an axially fixed relationship and to carry said inductor.

30. The transducer of claim 23, wherein said shunt assemblies comprise first and second pairs of adjoining rotary vanes, each said pair disposed within one of said electromagnetic fields and operable to selectively shunt substantially all of its associated electromagnetic field.

31. The transducer of claim 23, wherein said inductors are disposed coaxially with said shafts and axially spaced from one another.

32. The transducer of claim 23, wherein said inductors have substantially identical dimensions and electrical properties.

33. Torque and torsion angle measuring apparatus comprising:
a shaft having an input end portion and an output end portion;
a first induction member concentric to said shaft and mounted on said input end portion for rotation therewith, said first induction member having electrically conductive portions and electrically insulating portions;
a second induction member mounted on said output end portion for rotation relative to said first induction member, said second induction member having electrically conductive portions and electrically insulating portions overlapping corresponding portions of said first induction member to a predetermined extent prior to application of a torque to be measured;
a coil at least approximately concentric to said shaft arranged in close proximity to said first and second induction members so that a magnetic field generated by said coil creates eddy currents in said second induction member varying in dependence upon the relative alignment of said electrically conductive portions of said first and second induction members, to effect a change in inductivity of said coil upon change in eddy currents to provide a measure of angular displacement of the input end portion to the output end portion of said shaft; and
control means in circuit with said coil operative to effect flow of alternating current therethrough to establish an electromagnetic field thereabout to create said eddy currents, said eddy current variances self coupling to said coil to effect a change in phase of said alternating current, said control means further effecting generation of an applied torque signal as a function of said alternating current phase change.

34. Measuring apparatus as set forth in claim 33, wherein alignment of said electrically conductive portions of said first and second induction members decreases with increasing torque transmitted through said shaft causing relative angular displacement, or twist, of said shaft portions, thereby increasing said eddy currents and decreasing said inductivity.

35. Measuring apparatus as set forth in claim 33, wherein said first and second induction members each comprises a disc.

36. Measuring apparatus as set forth in claim 35, wherein each of said discs is made of electrically conductive material; and wherein said first disc has a plurality of substantially identical cut-out portions spaced at equal intervals in the peripheral direction thereof.

37. Measuring apparatus as set forth in claim 36, wherein said second disc is substantially identical to said first disc.

38. Measuring apparatus as set forth in claim 37, wherein each of said cut-out portions is sector-shaped.

39. Measuring apparatus as set forth in claim 35, wherein said second induction disc is arranged at a short distance from one side of said first induction disc, and wherein said coil is arranged a short distance from said first induction disc on the side facing away from said second induction disc.

40. Measuring apparatus as set forth in claim 33, wherein said coil is a disc-shaped flat coil.

41. A torque transducer comprising:
an input shaft for receiving operator applied torque;
an output shaft adapted for operatively engaging a load;
first and second magnetically isolated inductors;
means to energize said inductors to establish a distinct electromagnetic field about each of said inductors; and
electromagnetic field shunt assemblies operatively engaging said shafts for selective complementary positioning within said electromagnetic fields in response to relative rotational displacement of said shafts to effect generation of a signal representative of said applied torque, said field shunt assemblies disposed in close proximity to said inductors whereby each said distinct electromagnetic field creates eddy currents within said field shunt assemblies varying as a function of said relative rotational displacement to effect complementary changes in inductivity of said inductors and thereby generate said applied torque signal, said shunt assemblies comprising first and second pairs of adjoining rotary vanes, each said pair disposed within one of said electromagnetic fields and operable to selectively shunt substantially all of its associated electromagnetic field, said vane pairs being resiliently axially spaced from one another by biasing means interposed therebetween and disposed concentrically upon one of said shafts.

42. A torque transducer comprising:
an input shaft for receiving operator applied torque;
an output shaft adapted for operatively engaging a load;
first and second magnetically isolated indicators disposed coaxially with one of said shafts and axially spaced from one another;
means to energize said inductors to establish a distinct electromagnetic field about each of said inductors; and
electromagnetic field shunt assemblies operatively engaging said shafts for selective complementary positioning within said electromagnetic fields in response to relative rotational displacement of said shafts to effect generation of a signal representative of said applied torque, said field shunt assemblies disposed in close proximity to said inductors whereby each said distinct electromagnetic field creates eddy currents within said field shunt assemblies varying as a function of said relative rotational displacement to effect complementary changes in inductivity of said inductors and thereby generate said applied torque signal, said shunt assemblies comprising a generally cylindrical carrier disposed concentrically with said shaft associated with said inductors and means operative to selectively axially reposition said carrier between two limits of travel as a function of said relative rotational displacement of said shafts whereby said carrier is operative to simultaneously complementarily shunt said electromagnetic fields.

43. A torque transducer comprising:
an input shaft for receiving operator applied torque;
an output shaft disposed coaxially with said input shaft and adapted for operatively engaging a load;
a housing operative to retain said shafts in an axially fixed relationship;
a logic circuit comprising first and second magnetically isolated inductors carried by said housing and energization means to establish a distinct electromagnetic field about each of said inductors; and
electromagnetic field shunt assemblies operatively engaging said shafts for selective complementary positioning within said electromagnetic fields in response to relative rotational displacement of said shafts to effect generation of a signal representative of said applied torque, said field shunt assemblies disposed in close proximity to said inductors whereby each said distinct electromagnetic field creates eddy currents within said field shunt assemblies varying as a function of said relative rotational displacement to effect complementary changes in inductivity of said inductors and thereby generate said applied torque signal, said shunt assemblies comprising first and second pairs of adjoining rotary vanes, each said pair disposed within one of said electromagnetic fields and operable to selectively shunt substantially all of its associated electromagnetic field, said vane pairs being resiliently axially spaced from one another by biasing means interposed therebetween and disposed concentrically upon said shafts, said biasing means further operative to simultaneously bias each said vane pair into intimate contact with one of said inductors.

44. A torque transducer comprising:
an input shaft for receiving operator applied torque;
an output shaft disposed coaxially with said input shaft and adapted for operatively engaging a load;
a housing operative to retain said shafts in an axially fixed relationship;
a logic circuit comprising first and second magnetically isolated inductors disposed coaxially with said shafts, axially spaced from one another and carried by said housing, and energization means to establish a distinct electromagnetic field about each of said inductors; and
electromagnetic field shunt assemblies operatively engaging said shafts for selective complementary positioning within said electromagnetic fields in response to relative rotational displacement of said shafts to effect generation of a signal representative of said applied torque, said field shunt assemblies disposed in close proximity to said inductors whereby each said distinct electromagnetic field creates eddy currents within said field shunt assemblies varying as a function of said relative rotational displacement to effect complementary changes in inductivity of said inductors and thereby generate said applied torque signal, said shunt assemblies comprising a generally cylindrical carrier disposed concentrically with said shafts and means operative to selectively axially reposition said carrier between two limits of travel as a function of said relative rotational displacement of said shafts whereby said carrier is operative to simultaneously complementarily shunt said electromagnetic fields.

45. A torque transducer comprising:

an input shaft for receiving operator applied torque;

an output shaft disposed coaxially with said input shaft and adapted for operatively engaging a load;

a housing operative to retain said shafts in an axially fixed relationship;

a logic circuit comprising first and second magnetically isolated inductors carried by said housing and energization means to establish a distinct electromagnetic field about each of said inductors; and electromagnetic field shunt assemblies operatively engaging said shafts for selective complementary positioning within said electromagnetic fields in response to relative rotational displacement of said shafts to effect generation of a pulse width modulation signal representative of said applied torque, said field shunt assemblies disposed in close proximity of said inductors whereby each said distinct electromagnetic field creates eddy currents within said field shunt assemblies varying as a function of said relative rotational displacement to effect complementary changes in inductivity of said inductors and thereby generate said applied torque signal, said logic circuit further comprising, means operative to monitor voltage potential on said first inductor and to generate a first comparison signal as a function thereof, means operative to monitor voltage potential to said second inductor and to generate a second comparison signal as a function thereof, and means to receive said first and second comparison signals and to generate said applied torque signal as a function of the difference therebetween.

* * * * *